Fig. 2
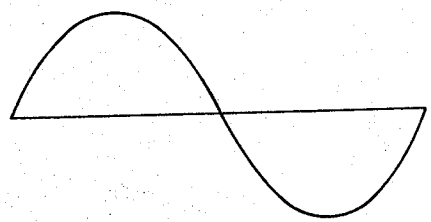
Fig. 3
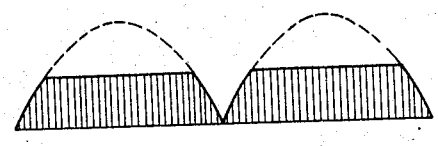
Fig. 4
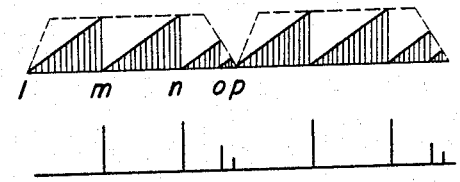
l　m　n op
Fig. 5
Fig. 6
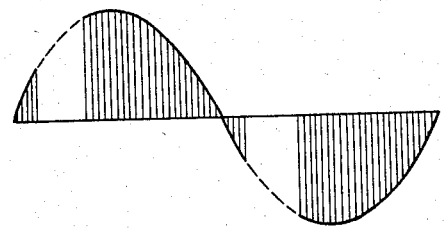
Fig. 7
Fig. 8
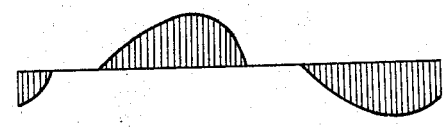

United States Patent Office 3,265,907
Patented August 9, 1966

3,265,907
DIMMERS FOR DISCHARGE LAMPS
Mamoru Kurata and Atsuo Ichikawa, Yokohama, Japan, assignors to Tokyo Shibaura Electric Co., Ltd., Kawasaki-shi, Japan, a corporation of Japan
Filed June 7, 1963, Ser. No. 286,315
Claims priority, application Japan, June 8, 1962, 37/29,744
2 Claims. (Cl. 307—88.5)

This invention relates to dimmers for discharge lamps.

Heretofore, dimmers for incandescent lamps have included a variable phase pulse oscillator the output of which is utilized to operate a conduction controlling device for controlling the load current. Such arrangement, however, cannot be used with inductive loads including discharge lamps since in such cases the conduction controlling device cannot operate by the variable phase pulse oscillator. The present invention is intended to overcome such difficulty and has for its object to provide a dimmer which operates successfully with an inductive load comprising discharge lamps and stabilizers therefor.

According to the present invention, there is provided in a lighting circuit including a conduction controlling device arranged in one of the A.C. power lines so that the power is supplied through the conduction controlling device to a discharge lamp load a dimmer for discharge lamps comprising a variable phase pulse oscillator and a silicon-controlled rectifier connected in combination with rectifier elements across the A.C. power lines and arranged to receive the output of said pulse oscillator and produce a load current which is effective to operate the conduction controlling device.

Figure 1:
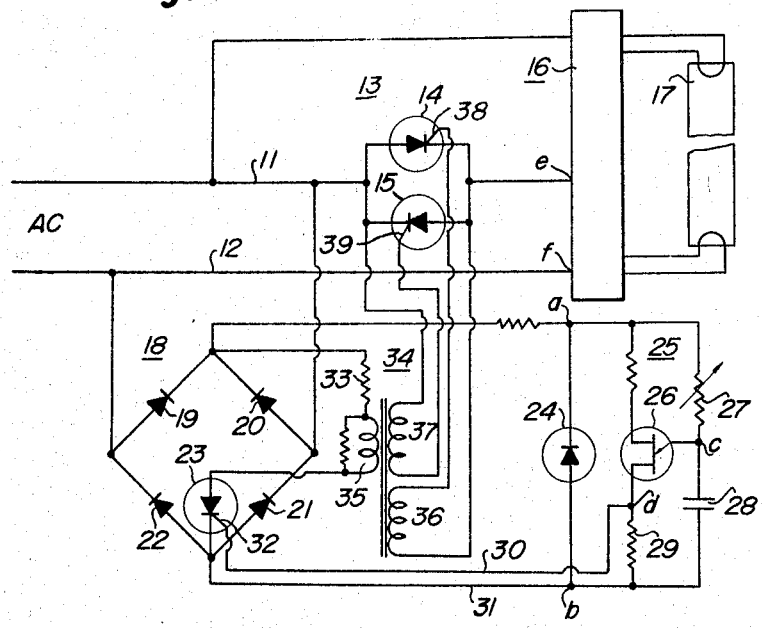
Figure 9:
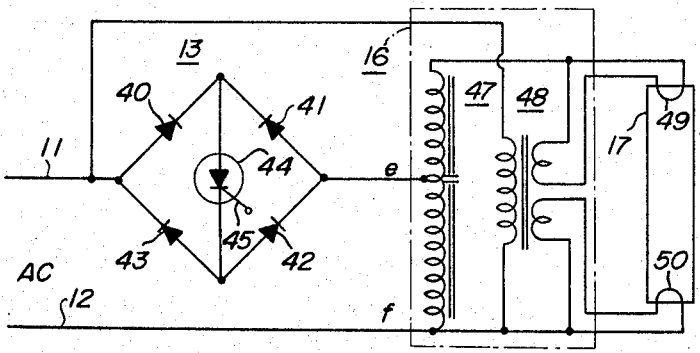

The present invention will now be described in detail with reference to the accompanying drawings, in which:

FIG. 1 is a circuit diagram of a dimmer embodying the present invention;

FIGS. 2 to 8 inclusive illustrate waveforms obtaining at respective points in the circuit of FIG. 1; and FIG. 9 is a circuit diagram of another embodiment including a modified form of conduction controlling device and one form of stabilizer.

Referring to the drawings and first to FIG. 1, there is shown a load circuit including a discharge lamp 17 and a stabilizer 16 therefor and arranged to be supplied through A.C. power lines 11 and 12 by way of a conduction controlling device 13, which includes two parallel-connected silicon-controlled rectifiers 14 and 15 arranged opposite in polarity. Reference numeral 18 generally indicates a bridge circuit comprised of a combination of four rectifier elements 19, 20, 21 and 22 and a silicon-controlled rectifier 23. An A.C. power source AC is connected to the input side of the bridge circuit while a circuit including silicon-controlled rectifier element 23 is connected to the output of the bridge circuit. The rectifier voltage from the bridge circuit 18 is maintained substantially at a constant level by a constant voltage diode 24 and applied to a pulse oscillator 25 consisting essentially of a unijunction transistor 26. The constant voltage is also impressed across a circuit including a series connection of a variable resistance 27 and a capacitor 28 to charge the latter according to the time constant of the circuit. When the charge voltage exceeds a predetermined value, the unijunction transistor 26 operates to cause the capacitor to discharge through a resistance 29. As a consequence, a pulse is produced across the opposite ends of the resistance 29 and is fed through conductors 30 and 31 to the gate 32 of silicon-controlled rectifier 23 to render the latter conductive. Accordingly, current flows through a series load circuit including a resistance 33 and the primary winding 35 of a transformer 34 to energize the primary winding 35. The voltages thus induced across two secondary windings 36 and 37 of the transformer 34 are fed to the gates 38 and 39 of respective silicon-controlled rectifiers 14 and 15 of the conduction controlling device 13 to render the two silicon-controlled rectifiers conducting in an alternate fashion while at the same time controlling the load current imposed upon the stabilizer and discharge lamp. In order to dim the discharge lamp by controlling the load current, the variable resistance 27 in the pulse oscillator is adjusted properly to vary the phase of the pulse output.

The operation of the circuit of FIG. 1 will be described below in further detail with reference to FIGS. 2 to 8 inclusive.

FIG. 2 illustrates the waveform of the A.C. voltage at its supply source AC and FIGS. 3 to 8 illustrate waveforms obtaining at respective points in the circuit of FIG. 1 corresponding to the supply voltage. In FIG. 3, the voltage across the terminals $a$ and $b$ of constant voltage diode 24 is shown by hatching. (Hatching is also used in all of the remaining waveform diagrams.) FIG. 4 illustrates the charge and discharge voltage of the capacitor 28 in the pulse oscillator 25, that is, it shows the voltage across the terminals $b$ and $c$ of the capacitor 28 when the voltage of FIG. 2 is applied to the series circuit including a given value of variable resistance 27 and capacitor 28 and the capacitor is alternately charged and discharged at a given time constant. In FIG. 4, the charge is started at point $l$ and the capacitor is instantaneously discharged and starts to be charged upon completion of the discharge at points $m, n, \ldots$. FIG. 5 illustrates the pulse voltage developing across the terminals $d$ and $b$ of the resistance 29 in the pulse oscillator 25. It will be seen from comparison between FIGS. 4 and 5 that the phase of the pulse voltage is varied by adjusting the variable resistance 27. When the voltage of FIG. 5 is fed to the gate 32 of the silicon-controlled rectifier 23, the latter is rendered conductive and a voltage as shown in FIG. 6 is induced across the terminals of the primary winding 35 of the transformer 34 and accordingly across the terminals of the two secondary windings 36 and 37. Namely, FIG. 6 illustrates the gate voltage for the silicon controlled rectifiers 14 and 15. When supplied with such gate voltage the rectifiers 14 and 15 are rendered conductive so that a load voltage as shown in FIG. 7 is applied across the input terminals $e$ and $f$ of the stabilizer 16 to obtain a load current of the waveform as shown in FIG. 8.

Having described an embodiment employing a conduction controlling device including two parallel-connected silicon-controlled rectifiers arranged opposite in polarity, it will be apparent that any other form of conduction controller may also be employed with success. For example, the present dimmer may include a modified form of conduction controller 13 and stabilizer 16 interconnected as shown in FIG. 9. Like references indicate like or corresponding parts in FIGS. 1 and 9. The conduction controller 13 shown in FIG. 9 includes a bridge rectifier circuit having four rectifier elements 40, 41, 42 and 43 and a single silicon-controlled rectifier 44 connected between the opposite output apexes, and to the gate 45 of which rectifier is fed the output of the bridge circuit 18 shown in FIG. 1. The stabilizer 16 is comprised of an autotransformer 47 and a cathode heating transformer 48. The secondary output of the autotransformer 47 is impressed across the opposite cathodes 49 and 50 of the discharge lamp 17 while the voltages induced across the two respective secondary windings of the transformer 48 are applied to the respective cathodes 49 and 50. Though the above-described pulse oscillator takes the form of a reluxation oscillator including a unijunction transistor, it may, of course, be replaced by any other form of pulse oscillator.

As apparent from the foregoing, the present dimmer is arranged so that the output of a variable phase pulse oscillator is fed to the gate of a silicon-controlled rectifier to obtain a voltage of variable wavelength which is utilized to operate a conduction controlling device to control the load current and thus is reliable as a dimmer for discharge lamps unlike previous dimmers in which the conduction controller could not be operated by means of any variable phase pulse oscillator.

What is claimed is:

1. In a lighting circuit including a conduction controlling device connected in one of the A.C. power lines for supplying discharge lamps comprising in combination a dimmer comprising a rectifier bridge circuit having two pairs of opposed apices; connections from the A.C. power lines respectively to one pair of opposed apices; output connections respectively from the other pair of opposed apices; a series circuit connected between said output connections; a silicon-controlled rectifier having a gating electrode and a primary winding of a transformer connected in series to comprise said series circuit; a variable phase pulse oscillator connected to the gate of said silicon rectifier for applying pulses thereto; said transformer having at least one secondary winding; and a circuit for supplying output voltage from said secondary winding to said conduction controlling device.

2. The circuit of claim 1 wherein said variable phase pulse oscillator is connected to the output connections of said rectifier to receive input voltage therefrom and comprises a multiple leg parallel circuit; a resistor and a capacitor connected in series to comprise one leg of said parallel circuit; resistor means and a unijunction transistor having a gating electrode connected in series to comprise another leg of said parallel circuit; and a connection from said first leg between the resistor and capacitor to said gate electrode.

References Cited by the Examiner
UNITED STATES PATENTS

| | | | |
|---|---|---|---|
| 2,841,239 | 1/1958 | Hall et al. | 328—81 X |
| 2,920,240 | 1/1960 | Macklem. | |
| 3,128,440 | 4/1964 | Davis. | |
| 3,130,347 | 4/1964 | Harpley | 315—98 |
| 3,146,392 | 8/1964 | Sylvan. | |
| 3,159,766 | 12/1964 | Harpley | 307—88.5 X |
| 3,170,085 | 2/1965 | Genuit. | |
| 3,207,975 | 9/1965 | Pintell. | |

ARTHUR GAUSS, *Primary Examiner.*

I. C. EDELL, *Assistant Examiner.*